(12) United States Patent
Frank et al.

(10) Patent No.: US 6,216,796 B1
(45) Date of Patent: Apr. 17, 2001

(54) TRACTOR RAKE ATTACHMENT FOR LIGHT AND MEDIUM GRADE SOIL WORK

(76) Inventors: David B. Frank, 17 Muddy Run Rd., Frenchtown, NJ (US) 08825; Keith d. Skibinski, 482 Harmony Brass Castle Rd., Phillipsburg, NJ (US) 08865

( * ) Notice: Subject to any disclaimer, the term of this patent is extended or adjusted under 35 U.S.C. 154(b) by 0 days.

(21) Appl. No.: 09/317,776

(22) Filed: May 24, 1999

(51) Int. Cl.[7] .................................................. A01B 49/02
(52) U.S. Cl. .......................................................... 172/684.5
(58) Field of Search ..................................... 172/198, 195, 172/197, 199, 200, 684.5, 445.1, 445.2, 449

(56) References Cited

U.S. PATENT DOCUMENTS

| | | |
|---|---|---|
| 37,234 | 12/1862 | Kelsey . |
| 304,737 | 9/1884 | Kirby . |
| 1,019,153 | 3/1912 | Hughes . |
| 1,347,485 | 9/1920 | Allyn . |
| 1,511,292 | 10/1924 | McLeod . |
| 1,666,836 | 4/1928 | Santee . |
| 2,618,111 | 11/1952 | Egstad . |
| 3,470,964 | 10/1969 | West et al. . |
| 3,613,802 | 10/1971 | Carlson et al. ...................... 172/197 |
| 5,000,270 | 3/1991 | Phillips ................................ 172/540 |
| 5,018,587 | 5/1991 | Gangrud et al. .................... 172/612 |
| 5,211,247 | 5/1993 | Johnsen ............................... 172/197 |

*Primary Examiner*—Christopher J. Novosad
(74) *Attorney, Agent, or Firm*—Roberts & Mercanti, LLP

(57) ABSTRACT

A tractor rake attachment is disclosed that includes a rake platform, the rake platform having a plurality of tines secured to a rake platform with the tines having a length that extend perpendicular to the rake platform. The tines are approximately evenly spaced along the length of the rake platform and have a depth that permits elastic deformation of the tine when contacted by ta heavy rock. The tines on the rake platform may be forwardly adjusted to create a angle along the rake platform in relation to the movement of a tractor rake. The rake platform is capable of being attached to a tractor rake so that the horizontal length of the tractor rake is extended with the tines extending in a downward direction from the rake platform to the ground. A method for light and medium field grading also is disclosed.

18 Claims, 2 Drawing Sheets

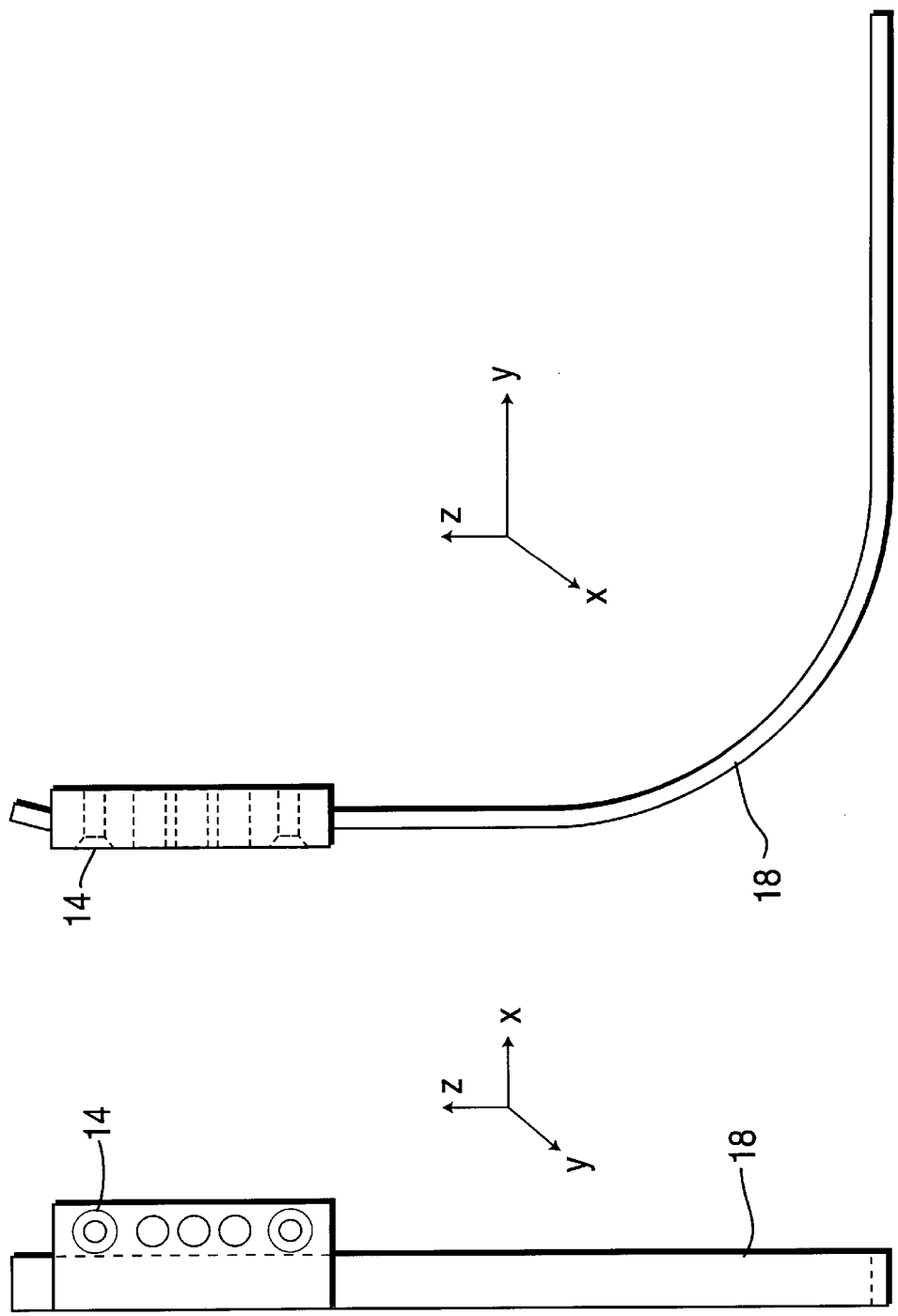

TRACTOR RAKE ATTACHMENT FOR LIGHT AND MEDIUM GRADE SOIL WORK

BACKGROUND OF THE INVENTION

1. Field of the Invention

The present invention generally relates to rake attachments for working soil, particularly to rake attachments for working light and medium grade soil surfaces, and more particularly to rake attachments for clearing and finishing upper ground and/or topsoil in preparation for construction or farming operations.

2. Description of Related Art

Light and medium landscape grading, particularly in the preparation of farming and community development landscaping, requires the removal of light rocks, rubble and debris from an area. Rakes are used in the preparation of these areas. One of the most common types of rakes known for use with light and medium grading is the landscape rake.

Landscape rakes provide a straight or linear cross-frame that is generally fixed on one or more wheel supports having adjustable wheel heights. The landscape rake is attached to a tractor that pulls the landscape rake over the ground. Tines along the length of the cross-frame rake light rocks and debris from the surface of the ground, generally in preparation for construction or fanning operations. During this operation, however, the light rocks or debris are pulled from the surface and are discarded along the edges of either side of the landscape rake in windows. These windows of debris and light rock must be collected manually to clear the field. This manual collection requires additional time, and is extremely inefficient in the preparation of an area for farming, construction or general landscaping.

In addition to the landscape rake, several other types of raking devices are known. These include a road and field scraper having one or more semicircularly or elliptically curved pieces of metal disclosed in U.S. Pat. No. 304,737 (Kirby), a road scraper and grader disclosed in U.S. Pat. No. 1,019,153 (Hughes) having front and rear blades with a center blade detachably connected thereto by straps and bolts, and the device of U.S. Pat. No. 5,018,587 (Gandrud et al.) with abrush attachment having end-to-end, oppositely angled brushes on the bottom of a frame with semirigid plates. None of these patents disclose any type of tines or teeth for engaging light rocks or debris in clearing the ground.

U.S. Pat. No. 37,234 (Kelsey) discloses a V-shaped harrow and a scraper. U.S. Pat. No. 1,347,485 (Allyn) discloses a road drag having steel blades with a V-shaped frame and an auxiliary drag having a plurality of teeth that breaks up lumps of materials. U.S. Pat. No. 1,666,836 (Santee) discloses a stone gatherer having forward rake teeth of a casing where rocks travel through the casing to a discharge opening, and into a chute. U.S. Pat. No. 2,618,111 (Egstad) discloses a wheel driven stone gathering machine having stone-engaging collecting arms with forwardly opening scoops to engage stones. All of these devices arrange the rocks in a windrow-like manner.

Another device disclosed in U.S. Pat. No. 1,511,292 (McLeod) shows curved teeth that permit undersize rock or the like to freely pass between adjacent teeth while the forward faces of the teeth serve to push or draw the oversize rock toward one end of the rake. However, McLeod does not disclose any angled side members.

U.S. Pat. No. 3,613,802 (Carlson et al.) discloses a sand trap rake for golf courses having a rake which is made up of a plurality of sections, each section comprising a V-shaped draft member having a forwardly directed apex which has a universal connection to the tractor-mounted draft bar and the rake having V-shaped teeth. U.S. Pat. No. 5,000,270 (Phillips) discloses a tool assembly having a prickle chain that rotates when dragged, for tilling, secondary cultivation, ground leveling, trash removal and/or other ground working operations.

U.S. Pat. No. 3,470,964 (West et al.) discloses earth working implements having a lift-latch assembly that is pivotally mounted on a transverse frame member. While U.S. Pat. No. 5,211,247 (Johnsen) discloses a landscaping device to remove debris such as rocks, large clumps of hardened soil, undesired plant material, and the like with the Taking portion of Johnsen preforming heavy grading of an area. Both West et al. and Johnsen provide a heavy grade leveling of the ground that rips the soil area.

As discussed, these various devices are deficient for grading light and/or medium grade landscaping tasks. For example, the devices either address a "fine grading" such as Carlson et al. in the leveling of sand traps, or heavy grading found in Johnsen or West et al. that removes the layer of topsoil from the ground for contouring the soil into swales or berms. Devices that address light and medium grading operations generally discharge the rocks or debris in windrows.

In view of the foregoing, improvements are needed in the soil preparation of light and/or medium grade soil. There is a need for landscaping rake attachments that overcome the deficiencies of the previously discussed devices and that allow the clearing of light rock and/or debris with light and/or medium grade landscaping in an efficient manner. The present invention addresses the need to clear an area of landscape without the need for additional work in clearing windrows.

SUMMARY OF THE INVENTION

The present invention includes a tractor rake attachment consisting essentially of a rake platform, the rake platform having a plurality of tines secured thereto; the plurality of tines having a length that extend perpendicular to the rake platform and having a width wherein the plurality of tines are approximately evenly spaced along the length of the rake platform, the plurality of tines filter having a depth wherein each fine possesses a flexibility that permits elastic deformation of the tine along the depth of the tine when a force is applied approximately normal to the tine depth; the rake platform capable of being attached to the horizontal length of a tractor rake, wherein the plurality of tines extend in a downward direction from the rake platform to the ground; and, the tractor rake attachment capable of being supported by and attached to a tractor rake.

The present invention further includes the above described invention wherein two attachments are attached to the tractor rake extending from the opposite ends of a central section of the tractor rake, either as an integral part of the tractor rake or as a removable and/or adjustable attachment, mechanically fastened by pins, bolts, welds or other such methods.

Furthermore, the present invention includes a method for light and medium grading comprising the steps of providing tractor rake attachment consisting essentially of a rake platform, the rake platform having a plurality of tines secured thereto, the plurality of tines having a length that extend perpendicular to the rake platform and having a width wherein the plurality of tines are approximately evenly spaced along the length of the rake platform, the plurality of tines further having a depth wherein each tine possesses a flexibility that permits elastic deformation of the tine along the depth of the tine when a force is applied approximately normal to the tine depth, the rake platform capable of being attached to the horizontal length of a tractor rake, wherein the plurality of tines extend in a downward direction from the rake platform to the ground, and, the tractor rake attachment capable of being supported by and attached to a tractor rake; attaching the tractor rake attachment on the tractor rake; and, pulling the tractor rake having the attached tractor rake attachment thereon with a vehicle wherein the tractor rake collects debris along the front face of the tractor rake.

Additionally, the present invention includes a tractor rake attachment comprising a rake platform, the rake platform having a plurality of tines secured thereto; the plurality of tines having a length that extend perpendicular to the rake platform and having a width wherein the plurality of tines are approximately evenly spaced along the length of the rake platform, the plurality of tines further having a depth wherein each tine possesses a flexibility that permits elastic deformation of the tine along the depth of the tine when a force is applied approximately normal to the tine depth; the rake platform capable of being attached to the horizontal length of a tractor rake, wherein the plurality of tines extend in a downward direction from the rake platform to the ground; and, the tractor rake attachment capable of being supported by and attached to a tractor rake.

DETAILED DESCRIPTION OF THE PREFERRED EMBODIMENT

Figure 1:
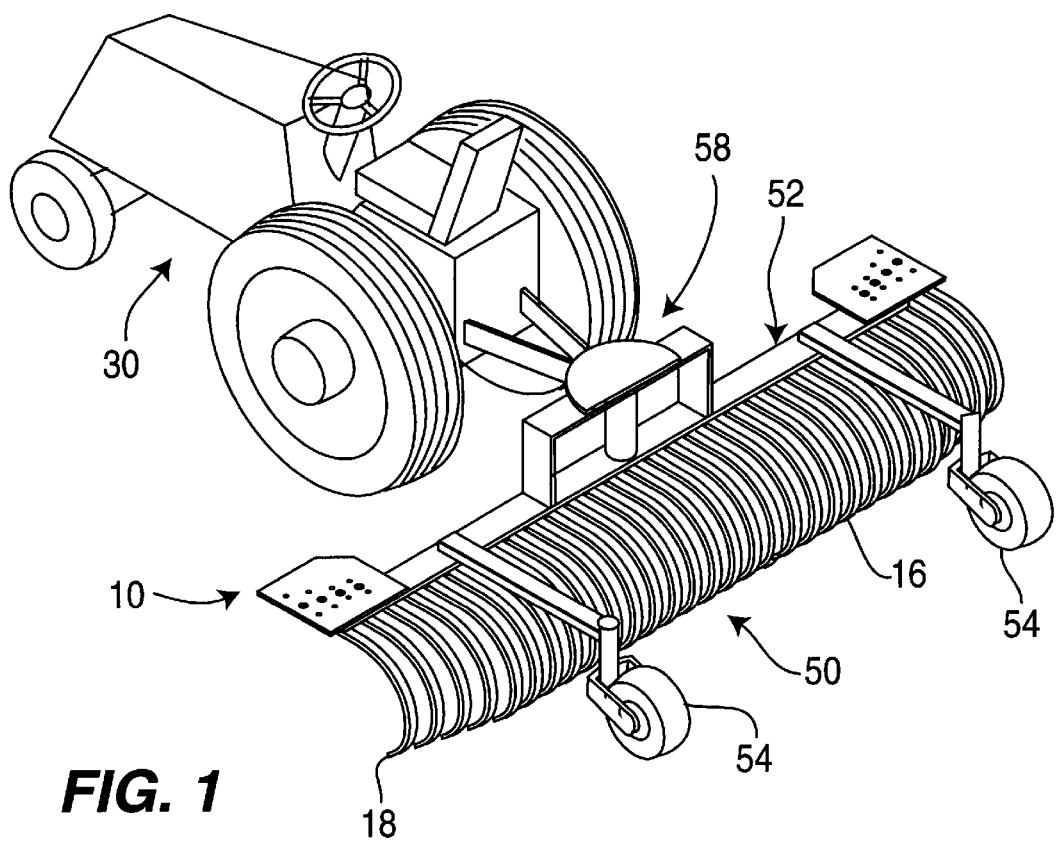
FIG. 1 shows an illustration of a tractor landscape rake with the attachment of the present invention for light and medium soil grading operations fixed thereto.

The present invention separates light rocks, rubble, debris and other similar objects from the soil without the loss of valuable topsoil or changes in the contours of the ground. While collecting objects from the soil, the present invention removes the objects from a work area without the necessity of multiple rake passes or other secondary removal operations of windrows forming from objects passing from the sides of the rake. Although natural hills, swales or berms in the soil are not significantly altered during lightmedium grading operations, the present invention smooths the ground soil without removing distinctive features useful in crop fields, housing development grounds, or other such soil projects. These land contours are commonly used on crop fields to direct water onto or away from designated areas or to provide distinctive dividing or partitioning land features within sections of a development to include or exclude particular landscaping designs. The present invention also may be used for sod or grass seed preparation.

As opposed to fine or sand-type grading devices, the present invention selectively scraps the soil surface, maintaining topsoil integrity while removing medium-scale objects. Sand-type grading is generally used within developed recreational areas, such as sand traps on golf courses, in-field baseball areas, pristine beach areas and/or other like grounds that are refined for general pedestrian traffic or play. Fine grading is used to sweep up areas of light trash or debris with minimal disturbance of the soil.

On the other hand, light/medium grading operations sufficiently sieve the upper layer of soil to ensure removal of light and medium sized rocks, such as those rocks measuring from about 0.75 inches to about 6 inches in diameter and/or weighing up to about 10 pounds. As rocks weighing greater than approximately 10 pounds are "by-passed", the present invention does not gouge areas of the landscape. The present invention provides a general evening of the ground that is sufficient to allow persons to transverse a medium/light graded area by foot without noticeable walking difficulty. Debris also is collected, such as broken or cut tree branches, crops due for rotation, scrubs, vegetation, roots, and other clumps of natural plants, and paper, plastic and/or metal products, such as discarded cups, plates, cans, bottles and the like, and/or broken concrete pieces, stones and/or rubble, generally of similar dimensions and/or weights as the previously described light and medium sized rocks.

In contrast to heavy grading, such as the purposeful removal or creation of swales and/or berms in the landscaping operations, the present invention does not dramatically change the soil contour or flow and does not "level" an area During heavy grading, heavy or substantial rocks such as rocks weighing from about 10 pounds or greater are excavated from the land. For example, contours within the ground area that vary in height from the surrounding land at a height or depth of from about 2 inches or greater, generally up to about two feet, are leveled with heavy grading.

As seen in FIG. 1, the present invention is an attachment 10 that connects to a tractor rake 50 for collection of light and medium rocks and/or other types of debris without forming windrows. Tractor rakes 50 that may incorporate or attach the present invention thereto include any rake that permits light and/or medium landscaping. Representative rakes include the landscape rake, and the like. The landscape rake is hitched to the back end of a tractor or other similar vehicle 30 in a tandem configuration, and pulled over the ground.

Landscape rakes have a straight or linear cross-frame 52 that is generally movably fixed on one or more adjustable wheels. The cross-frame 52 of the rake 50 generally measures from about four feet to about twelve feet in length and extends perpendicular to the forward movement of the tractor-rake tandem configuration. Rake tines 16 along the cross-frame 52 extend perpendicular to the cross-frame 52 in a downward direction from the cross-frame 52 to the ground. Rake tines 16 are generally fixed to the cross-frame 52 by bolts that are tightened to ensure that the rake tines 16 remain on the cross-frame 52 during light/medium grading operations. The rake tines 16 are approximately evenly spaced along the length of the cross-frame 52. During light/medium grading or raking operations, heavy rocks are not collected by the rake 50 and remain on the land by momentarily deforming the rake tines 16 as the rake tines 16 pass over the rocks. With the tractor 30 and rake 50 designed to function at any suitable speed, including up about 10 mph or 15 mph, or more with proper conditions, the rake tines 16 of the rake 50 should deform in response impact with a heavy rock or other similar objects at operational speeds. The tractor rake 50 typically has a harness section 58 that connects the tractor rake 50 behind and in tandem placement with a tractor 30. The rake 50 may be canted in relation to the movement of the tractor 30 by a pin mechanism on the harness 58. Preferably, the harness 58 is radially adjustable to rotate the cross-frame 52.

As further seen in FIG. 1, the attachment 10 of the present invention may be used in combination with tractor rakes 50 that comprise at least one cross-frame 52 measuring from about two feet or more, more preferably from about three feet to about twenty feet, still more preferably from about four feet to about twelve, and most preferably from about six feet to about eight feet in length. Preferably the rake 50 with connected attachment 10 has a length equal to or greater than the width of the wheel base of the tractor 30, more preferably the rake 50 with connected attachment 10 has a length of from about 25% wider or more than the width of the base of the tractor 30 or more. As such, the rake 50 and attachment 10 may remove any tire tracks from the work area from the rake 50 and attachment 10 being pulled by the tractor 30. Rake tines 16 attached to the cross-frame 52 may be detachably or integrally fixed to the cross-frame 52, preferably having a length of from about six inches to about forty-eight inches, more preferably from about twelve inches to about thirty-six inches, still more preferably from about fifteen inches to about twenty-four inches, and most extends perpendicular to the tractor-rake tandem configuration. Rake tines 16 along the cross-frame 52 extend perpendicular to the cross-frame 52 in a downward direction from the cross-frame 52 to the ground, and may be mechanically connected to the cross-frame 52 with such methods as bolts, welds, and other like methods that ensure the rake tines 16 remain on the cross-frame 52 during light/medium grading operations. The rake tines 16 are arranged approximately evenly spaced along the length of the cross-frame 52 to provide a consistent grading over the width of the cross-frame 52 for small and medium sized rocks and debris. The harness section 58 or other like device connects the tractor rake 50 behind and in tandem placement with a tractor, or tractor-like vehicle 30 that pulls the rake 50 to perform landscaping operations.

During the raking operation, the rake tines 16 pull and collect light/medium objects from the surface of the ground. Without the incorporation of the attachment 10 of the present invention onto the rake 50, the objects are discarded along the edges of either side of the rake 50 in windrows, requiring a separate clearing operation to clear the windrows, such as additional sweeps of the rake 50 or having the objects hand-carried from the field.

As the present invention is directed to light and/or medium grading operations, additional components attached to the tractor rake 50 that perform heavy grading functions generally defeat the purpose and use of the present invention. These additional components would include land scrapers, levelers, excavation devices, fixed teeth arrangements for cutting into the ground, and other like heavy grading devices. The rake platform attachment 10 of the present invention, when secured to and pulled with the rake 50 behind the tractor 30, performs light and/or medium grade operations. For the combination of the attachment 10, rake 50 and tractor 30 to be used within the scope of the present invention for grading a field, other components used in conjunction with the combination should not perform other types of grading operations, i.e., heavy grading operations.

Figure 2:
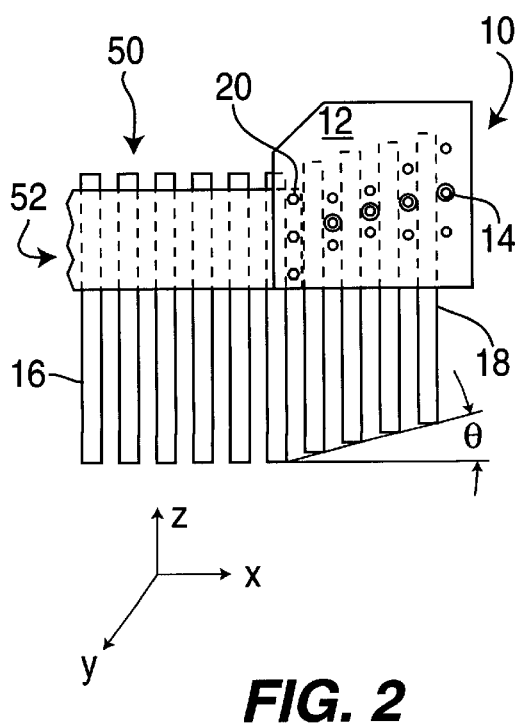
FIG. 2 shows a top view of a detachable tractor rake attachment for light and medium soil grading operations having adjustable angle configurations for attached rake platform in relation to the tractor rake.
Figure 3:
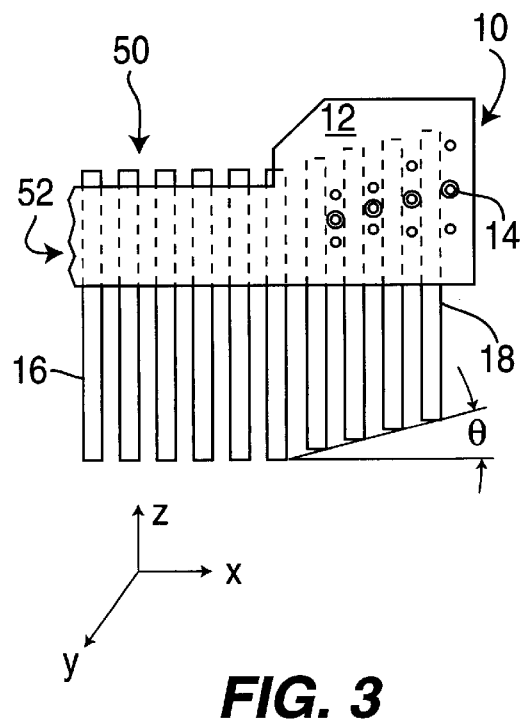
FIG. 3 shows a top view of a tractor rake having a tractor rake attachment that is structurally part of the tractor rake; and, FIGS. 4A and 4B show a top and side view of the adjustable attachment tines of the present invention.

FIGS. 2 and 3 further show the attachment 10 comprising a rake platform 12 that is attached to and forming part of the tractor rake 50. The rake platform 12 may extend the rake 50 along the longitudinal length of the cross-frame 52. Generally two rake platforms 12 are attached to the tractor rake 50 that extend from the opposite ends of the cross-frame 52 of the tractor rake 50. The rake platform 12 of the attachment 10 preferably is from about five inches to about seventy inches in length (along the direction of the length of the cross-frame 52), more preferably from about twenty-four inches to about forty-eight inches in length, and most preferably from about twenty-four to about thirty-six inches in length. As the rake cross-frame 52 is typically pulled perpendicular to the movement of the tractor 30, rocks and/or debris tends to pass along both sides of the rake 50. A rake platform 12 attached to both sides of the rake 50 provides a collection of the rocks and/or debris without any windrow forming. In the event that a windrow is desired on either side of the rake 50, a single rake platform attachment 10 may be fixed to the rake 50 on the side opposite to the side from which the windrow is desired.

As seen in FIG. 2, when the attachments 10 are configured to be detachable from the tractor rake 50, the attachment 10 may be secured to the rake 50 in any attaching means 20 that provides a reliably secure hold of the rake platform 12 to the cross-frame 52 that also permits dis-attachment. Additionally, a connecting means 14 secures attachment tines 18 to the rake platform 12. The attaching means 20 non-exclusively includes such means as pins, bolts, transverse screws, locking mechanisms, hinges, and other like connecting devices that are removable or that form part of the attachment 10. Preferably the rake platforms 12 are detachably connected to the cross-frame 52 by providing a mechanical connection, such as a welded or bolted member to the rake 50 and connecting the rake platform 12 thereto. Other embodiments of attaching the attachment 10 to the cross-frame 52 may include a hinge section that remains attached to or disconnects from the rake 50 when the rake platform 12 is removed. Additionally, the attaching means 20 between the rake platform 12 and the rake 50 may be attachable in a manner that fixes the rake platform 12 onto the rake 50 without a dis-attaching capability, such as self-locking bolts.

Attachment tines 18 are connected to the rake platform 12 with the connecting means 14, forming either permanent or adjustable angles in relations to the rake tines 16 on the cross-frame 52. The connecting means 14 may comprise bolts, screws, hinges, pins and/or other similar fastening mechanisms that secure the attachment tines 18 onto the rake platform sufficiently for the attachment tines 18 to withstand contact with a heavy rock. Preferably when a bolt and pin mechanism is used, a pin may configure the attachment tines 18 at various adjustable angles θ in relation to the cross-frame 52.

As shown in FIG. 3, in an alternative embodiment the attachment 10 may be structurally attached to and integrally part of the tractor rake 50. This includes such connections between the rake platform 12 and the rake 50 as permanently forming welds, bolts, and/or otherwise mechanically fastened, as well as singularly formed rake pieces that incorporate the attachment 10 with the rake 50. Preferably the attachment 10 is structurally attached to the rake 50, and more preferably the attachment 10 is structurally formed as part of the rake 50.

As seen in FIGS. 1, 2, 3, 4A and 4B, in either a structural or detaching member of the rake 50, the rake platform 12 of the attachment 10 spaces the attachment tines 18 to the tractor rake cross-frame 52 in an angled configuration. The attachment tines 18 of the attachment 10 form a forward angle θ in relation to the rake cross-frame 52 that is sufficient to retain rocks and/or debris on the front face of the forwardly moving rake 50 as the rake 50 is being pulled behind the tractor 30. The attachment tines 18 are mechanically fastened forwardly from the rake tines 16 of the cross-frame 52 when the tractor 30 moves in a forward direction. The attachment tines 18 are staggered in a forward direction from the line of rake tines 16 along the cross-frame 52, forming a forward angle θ. The side of the angle θ with the attachment tines 18 forms a constant, sharp or gradual slope in relation to the rake tines 16 on the tractor rake cross-frame 52, with either a constant or gradual slope preferred. The forward angle θ is preferably from about 0° to less than about 90°, such as 85°. More preferably, the attachment tines 18 are attached to the attachment 10 forming a forward angle θ of from about 30° to about 60° with the rake tines 16 on the tractor rake cross-frame 52, and most preferably, the attachment tines 18 form a forward angle of from about 40° to about 50°. The amount of angle θ may be varied to best operate under given soil, rock and debris conditions, as well as the lengths of continuous raking expected during the light or medium grade operations. Angles θ may be increased with the collection of larger rocks and or longer raking paths, with the optimum angle θ being determinable by those skilled in the art from the given conditions of the grounds. Pins, or other suitable fastening mechanisms, are used to adjust the attachment tines 18 on the rake platform 12 to form the angle in relation to the cross-frame 52.

Attachment tines 18 are mechanically fastened to the rake platform 12 by bolts, pins or other similar securing means that sufficiently fixes the attachment tines 18 to the rake platform 12 and ensures that the attachment tines 18 remain fixed to the rake platform 12 during light and/or medium grading operations. The attachment tines 18 are arranged approximately evenly spaced along the length of the attachment 10. The plurality of attachment tines 18 fixed to the rake platform 12 preferably are from about six inches to about twenty-four inches in length, and more preferably from about twelve inches to about eighteen inches in length. The attachment tine 18 length, herein referenced along the y-axis, extend approximately from about six inches to about twenty-four inches in length. The tine 18 width, herein referenced along the x-axis, is from about 0.5 inches to about two inches wide. The deflection of the attachment tines 18, as measured with the longitudinal pull or travel path of the rake 50 when pulled by the tractor 30 and referenced herein as the z-axis, generally measures up to about 3.0 inches without damage, i e., permanent deformation, to the attachment tines 18. This degree of attachment tine 18 depth along the z-axis imparts a flexibility to each of the plurality of attachment tines 18 on the rake platform 12 and permits elastic deformation of each of the attachment tines 18 along the depth, or z-axis, when a force is applied approximately normal to the attachment tine 18 depth (z-axis). The elasticity of the attachment tines 18 along the z-axis permits each of the attachment tines 18 to by-pass heavy objects, such as heavy rocks, that imparts sufficient force along the z-axis to deform the attachment tines 18. During light and medium grading or raking operations, heavy objects are not displaced with the passing of the rake 50 and remain on the land.

The attachment 10 provides attachment tines 18 that are at the same vertical level in relation to the ground, or height along the y-axis, as the rake tines 16 on the tractor rake 50. The attachment tines 18 and rake tines 16 are preferably adjustable along the y-axis with a means 54 for vertically adjusting the height of the rake platform 12. The means 54 for vertically adjusting the height of the rake platform 12 to the ground preferably is functionally dependent on an adjustable height of the cross-frame 52 of the rake 50. As the means 54 for vertically adjusting the height of the rake platform 12 is varied from a change in the height of the cross-frame 52, the height of the attachment tines 18 and rake tines 16 in relation to the ground are equally changed. As such, the attachment tines 18 and rake tines 16 retain a constant relationship to each other above the ground. Preferably, the means 54 for vertically adjusting the height of the rake platform 12 comprises at least one adjustable skid, guide and/or wheel, more preferably the attachment has two or more adjustable wheels. With the height adjustment of the rake platform 12, the attachment tines 18 fastened thereto are equally moved in relation to the ground, maintaining a uniform level of tines 16 and 18 along the length from the cross-frame 52 and attachment 10.

Topsoil preservation, and rock and debris removal, is enhanced with the present invention. The elastic attachment tines 18 are particularly useful in not displacing levels of the soil with the removal of the rocks and/or debris.

In operation, the above described invention is used in conjunction with a rake 50 for light or medium field grading. The attachment 10 is mechanically fastened, such as welded, onto the cross-frame 52 of the rake 50 that is hitched to the back of a tractor 30. The attachment 10 is positioned with the bottom of the attachment tines 18 generally planar with the bottom surface of the rake tines. By using an adjustable wheel, the rake 50 is adjusted in height for the rake tines 16 and attachment tines 18 to properly enter the ground that provides light-medium surface contact, or a depth of from about 0.5 inch to about 3.0 inches in soil, or up to about 6.0 or more inches in sand or other loose fill. The tractor 30 transverses over a field with the rake 50 and connected attachment 10 performing light/medium grading operations with the removal of rocks and/or debris from the ground. As the tines 18 of the attachment 10 contact a heavy object, the attachment tines 18 momentarily deform along the z-axis as the object passes through the attachment tines 18, and the object remains on the ground after the rake 50 passes. Lighter objects are collected in front of the rake 50, and as the objects pass to the sides of the rake 50, the objects are retained on the front face of the rake 50 by the attachments 10 connected to the rake 50. The collected objects remain collected along the front face of the tractor rake until the tractor 30 is stopped and/or the rake 50 is positioned to release the objects. For example, at the end of a run the rake 50 and attachment 10 may be raised from the ground at a desired location to remove collected objects for discard from the work area.

The vehicle 30 used to pull the rake 50 is preferably a tractor 30, but may comprise any tractor or motorized device useful in pulling tractor rakes 50.

The foregoing summary, description, and drawings of the invention are not intended to be limiting, but are only exemplary of the inventive features which are defined in the claims.

What I claim is:

1. A tractor rake comprising:
   a cross-frame having a plurality of tines secured thereto at a rear of the cross-frame;
   the plurality of tines comprising a first linear array of central tines arranged about parallel with a length of the rear of the cross-frame and terminating at each of the first linear array with second linear arrays of end tines positioned progressively increasingly more forward of the first linear array of central tines;

the plurality of tines extending rearwardly from the cross-frame and extending in a downward direction from the cross-frame to the ground, wherein the plurality of tines are approximately evenly spaced along the length of the cross-frame and have a flexibility that permits elastic deformation of the tines when a force is applied approximately normal to the tines.

2. The rake of claim 1, wherein the second linear arrays of end tines are positioned forward of the first linear array of central tines forming a forward angle of from about 0° to about 90° between the first linear array of central tines and the second linear arrays of end tines when viewed from above.

3. The rake of claim 1, wherein the second linear arrays of end tines are positioned forward of the first linear array of central tines forming a forward angle of from about 30° to about 60° between the first linear array of central tines and the second linear arrays of end tines when viewed from above.

4. The rake of claim 1, wherein the second linear arrays of end tines are positioned forward of the first linear array of central tines forming a forward angle of from about 40° to about 50° between the first linear array of central tines and the second linear arrays of end tines when viewed from above.

5. The rake of claim 1, further comprising means for vertically adjusting the height of the plurality of tines relative to the ground effective to change the vertical distance of the cross-frame to the ground.

6. The rake of claim 5, wherein the means for vertically adjusting the height of the plurality of tines relative to the ground comprises at least one adjustable wheel.

7. The rake of claim 1, wherein the tines are mechanically fastened to the rake platform.

8. The rake of claim 1, wherein the plurality of tines are approximately from about six inches to about twenty-four inches in length.

9. The rake of claim 8, wherein the plurality of tines are approximately from about twelve inches to about eighteen inches in length.

10. The rake of claim 1, wherein the rake platform is approximately from about five inches to about seventy inches in length.

11. The rake of claim 10, wherein the rake platform is approximately from about twenty-four inches to about thirty-six inches in length.

12. The rake of claim 1, wherein the plurality of tines form a uniform level length with rake tines on the tractor rake.

13. The rake of claim 1, wherein the position of the second linear arrays of end tines is adjustable.

14. The rake of claim 1 wherein the tines are curved.

15. The rake of claim 1 wherein the tines are removably attached to the cross-frame.

16. A method for field grading comprising the steps of: providing a tractor rake comprising a cross-frame having a plurality of tines secured thereto at a rear of the cross-frame, the plurality of tines comprising a first aligned linear array of central tines arranged about parallel with a length of the rear of the rake platform and terminating at each end with second linear arrays of end tines positioned forward of the central tines;

the plurality of tines extending rearwardly from the cross-frame and extending in a downward direction from the cross-frame to the ground, wherein the plurality of tines are approximately evenly spaced along the length of the cross-frame and have a flexibility that permits elastic deformation of the tines when a force is applied approximately normal to the tines;

attaching the tractor rake to a vehicle; and, pulling the tractor rake with a vehicle and collection debris on the ground with the first and second aligned linear arrays of tines.

17. The method or claim 16 wherein the tines are curved.

18. The method of claim 16 wherein the tines are removably attached to the cross-frame.

* * * * *